United States Patent
Song et al.

(10) Patent No.: US 7,755,272 B2
(45) Date of Patent: Jul. 13, 2010

(54) ANODE PANEL AND FIELD EMISSION TYPE BACKLIGHT UNIT HAVING THE SAME

(75) Inventors: Byong-gwon Song, Yongin-si (KR); Seung-nam Cha, Yongin-si (KR); Sun-il Kim, Yongin-si (KR); Ho-suk Kang, Yongin-si (KR); Yong-wan Jin, Yongin-si (KR); Min-jong Bae, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 228 days.

(21) Appl. No.: 11/987,384

(22) Filed: Nov. 29, 2007

(65) Prior Publication Data

US 2008/0164805 A1  Jul. 10, 2008

(30) Foreign Application Priority Data

Jan. 10, 2007  (KR)  .................... 10-2007-0003069

(51) Int. Cl.
*H01J 1/62*  (2006.01)
*H01J 5/16*  (2006.01)

(52) U.S. Cl. ................... 313/496; 313/111; 313/495

(58) Field of Classification Search ................ 313/495, 313/496, 111, 116, 477 R
See application file for complete search history.

(56) References Cited

U.S. PATENT DOCUMENTS

| 5,361,163 | A  | * | 11/1994 | Matsuda et al. ............. 359/452 |
| 5,725,787 | A  | * | 3/1998  | Curtin et al. ................. 216/25 |
| 6,935,914 | B2 | * | 8/2005  | Ito et al. ...................... 445/22 |
| 2004/0217686 | A1 | * | 11/2004 | Asano et al. ............. 313/477 R |
| 2005/0018286 | A1 | * | 1/2005  | Yoon et al. ................. 359/457 |
| 2005/0264167 | A1 | * | 12/2005 | Yoo et al. ................... 313/496 |

FOREIGN PATENT DOCUMENTS

JP  2006-092967  *  4/2006
KR  10-2005-0079341  8/2005

OTHER PUBLICATIONS

Office action from the Korean Intellectual Property Office issued in Applicant's corresponding Korean Patent Application No. 10-2007-0003069 dated Dec. 7, 2007.

* cited by examiner

*Primary Examiner*—Karabi Guharay
(74) *Attorney, Agent, or Firm*—Cantor Colburn LLP

(57) ABSTRACT

Provided is an anode panel of a field emission type backlight unit. The anode panel includes a substrate, an anode formed on a lower surface of the substrate, a phosphor layer coated on a lower surface of the anode and a liquid pack disposed on an upper surface of the substrate, said liquid pack having a transparent cover having cylindrical lens type curved portions and transparent liquid filling in the curved portions.

22 Claims, 3 Drawing Sheets

ANODE PANEL AND FIELD EMISSION TYPE BACKLIGHT UNIT HAVING THE SAME

CLAIM OF PRIORITY

This application makes reference to, incorporates the same herein, and claims all benefits accruing under 35 U.S.C. §119 from an application for ANODE PANEL AND FIELD EMISSION TYPE BACKLIGHT UNIT HAVING THE SAME earlier filed in the Korean Intellectual Property Office on 10 Jan. 2007 and there duly assigned Serial No. 10-2007-0003069.

BACKGROUND OF THE INVENTION

1. Field of the Invention

The present invention relates to a field emission type backlight unit, and more particularly, to an anode panel which provides improved brightness and prevents the temperature of a substrate from increasing, and a field emission type backlight unit having the anode panel.

2. Description of the Related Art

Flat panel display devices can be typically classified into light emitting type display devices and light receiving type display devices. Light emitting type display devices include cathode ray tubes (CRTs), plasma display panels (PDPs), and field emission display (FED) devices, and light receiving type display devices include liquid crystal display (LCD) devices. The LCD devices have the advantages of being lightweight and having low power consumption, but the drawback of being a light receiving type display device. As light receiving type display devices, the LCD devices cannot generate their own light and thus need to use external light to display images, therefore the images cannot be seen in a dark place. In order to address this disadvantage, a backlight unit is installed on the rear surface of the LCD devices.

Conventional backlight units mainly use cold cathode fluorescent lamps (CCFLs) as a line light source and light emitting diodes (LEDs) as a point light source. However, the conventional backlight units have high manufacturing costs due to their structural complexity, and high power consumption due to light reflection and transmittance of lights generated from sides of the backlight units. In particular, achieving uniform brightness of the generated lights become more difficult when the size of LCD devices increases. Recently, in order to address the above disadvantages, field emission type backlight units having a surface light emitting structure have been developed. The field emission type backlight units have lower power consumption than the backlight units that use the conventional CCFLs, and are advantageous in that they have relatively uniform brightness over a wide light emitting region. The field emission type backlight units can be used for illumination.

In a conventional field emission type backlight unit, an anode panel and a cathode panel are spaced apart so as to face each other. A constant interval is maintained between the anode panel and the cathode panel by spacers formed therebetween. Sealing members sealing a space between the anode panel and the cathode panel are formed on edges of the space between the anode panel and the cathode panel. The anode panel includes an upper substrate, an anode formed on a lower surface of the upper substrate and a phosphor layer coated on a lower surface of the anode. The upper substrate may be a glass substrate, and the anode may be formed of a conductive material such as indium tin oxide (ITO) or the like. The cathode panel includes a lower substrate, a cathode formed on an upper surface of the lower substrate and electron emission sources formed on an upper surface of the cathode. The lower substrate may be a glass substrate, and the cathode may be formed of a transparent conductive material or a metal material. The electron emission sources emit electrons due to an electric field generated between the anode and the cathode. Conventionally, a micro tip formed of a metal such as molybdenum is used as the electron emission sources. However, recently, carbon nanotube (CNT) emitters having a good electron emission property have been mainly used as the electron emission sources. A diffuser may be further formed on the anode panel to diffuse visible rays transmitted through the upper substrate.

In the conventional field emission type backlight unit as described above, when a predetermined voltage is applied between the anode and the cathode, electrons are emitted from the electron emission sources, and the emitted electrons are accelerated towards the anode so as to collide with the phosphor layer. Accordingly, the phosphor layer is excited so that visible rays are emitted, and the emitted visible rays are transmitted through the upper substrate and proceed outside. In the conventional field emission type backlight unit, since the visible rays emitted from the phosphor layer are radiated in all directions, the visible rays need to be guided towards an upper part of the upper substrate, on which a liquid crystal panel is disposed, in order to improve light efficiency. In order to do this, a reflective layer (not shown) formed of aluminum may be further formed on the phosphor layer.

The visible rays generated by the phosphor layer-proceed from a lower surface of the upper substrate formed of a glass to the outside of the unit. In this case, a refraction angle of the visible rays emitted to the outside of the unit is considerably greater than an incidence angle because of different refractive indices of the upper substrate and the medium at the outside of unit. Accordingly, part of the visible rays emitted from the phosphor layer deviate from the area over the upper substrate, and thus light efficiency is reduced. In the field emission type backlight, a high voltage should be applied to the anode in order to improve luminous efficiency of the phosphor layer. However, when a high voltage is applied to the anode, the temperature of the upper substrate on which the anode is formed, increases, and accordingly, the upper substrate may be damaged due to thermal expansion as a result of the increased temperature.

SUMMARY OF THE INVENTION

It is therefore one object of the present invention to provide an improved anode panel to overcome the problems stated above.

It is another object of the present invention to provide an anode panel which provides improved brightness by increasing light efficiency and prevents a temperature of a substrate from increasing, and a field emission type backlight unit having the anode panel.

According to an aspect of the present invention, an anode panel of a field emission type backlight unit includes: a substrate; an anode formed on a lower surface of the substrate; a phosphor layer coated on a lower surface of the anode; and a liquid pack disposed on an upper surface of the substrate, and having a transparent cover having lens type curved portions and a transparent liquid filling in the curved portions.

The substrate may be a transparent substrate.

The anode may be formed of a transparent conductive material.

The curved portions may have a cylindrical lens shape or a convex lens shape.

Spaces in the curved portions may be connected to each other so that the transparent liquid circulates in the transparent cover.

A reflective layer may be further formed on a lower surface of the phosphor layer.

According to another aspect of the present invention, there is provided a field emission type backlight unit including an anode panel and a cathode panel which are spaced apart so as to face each other, wherein the anode panel may include an upper substrate: an anode formed on a lower surface of the upper substrate; a phosphor layer coated on a lower surface of the anode; and a liquid pack disposed on an upper surface of the substrate, and having a transparent cover having lens type curved portions and a transparent liquid filling in the curved portions.

The transparent liquid may be water or transparent oil.

The electron emission source may be formed of carbon nanotubes (CNTs).

The backlight unit may further include a spacer disposed between the anode panel and the cathode panel and maintaining a predetermined interval between the anode panel and the cathode panel.

The backlight unit may further include a diffuser disposed on an upper portion of the anode panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
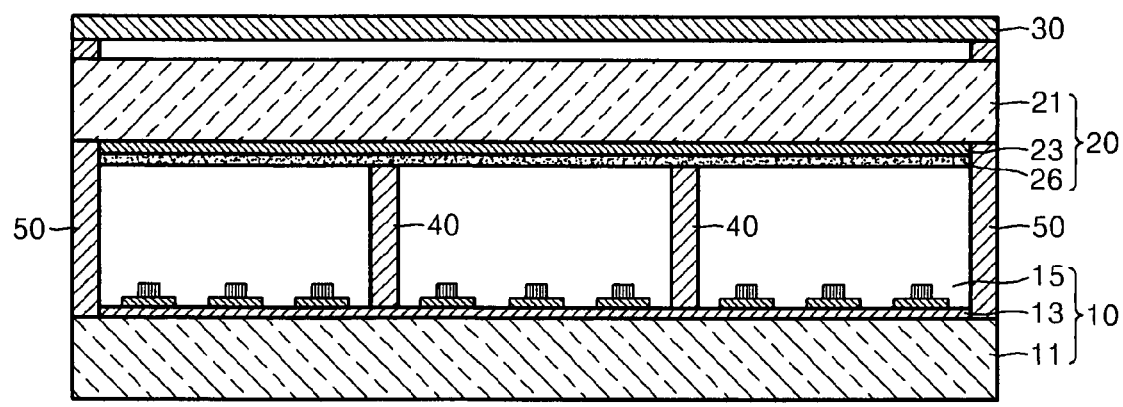
FIG. 1 is a schematic cross-sectional view illustrating a conventional field emission type backlight unit.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements. In the drawings, the thickness of layers and region are exaggerated for clarity.

As used in this specification, a substrate is that single monolithic structure which exposes a major surface area which a circuit such as an integrated circuit device, is created by such techniques as deposition, etching and doping of one or more layers of electrical conductors, insulators, semiconductors and dielectric materials.

FIG. 1 is a schematic cross-sectional view illustrating a conventional field emission type backlight unit. Referring to FIG. 1, an anode panel 20 and a cathode panel 10 are spaced apart so as to face each other. A constant interval is maintained between anode panel 20 and cathode panel 10 by spacers 40 formed between anode panel 20 and cathode panel 10. Sealing members 50 sealing a space between anode panel 20 and cathode panel 10 are formed on edges of the space between anode panel 20 and cathode panel 10. Anode panel 20 includes an upper substrate 21, an anode 23 formed on a lower surface of upper substrate 21 and a phosphor layer 26 coated on a lower surface of anode 23. Upper substrate 21 may be a glass substrate, and anode 23 may be formed of a conductive material such as indium tin oxide (ITO) or the like. Cathode panel 10 includes a lower substrate 11, a cathode 13 formed on an upper surface of lower substrate 11 and electron emission sources 15 formed on an upper surface of cathode 13. Lower substrate 11 may be a glass substrate, and cathode 13 may be formed of a transparent conductive material or a metal material. Electron emission sources 15 emit electrons due to an electric field generated between anode 23 and cathode 13. Conventionally, a micro tip formed of a metal such as molybdenum may be used as the electron emission sources 15. However, recently, carbon nanotube (CNT) emitters having a good electron emission property have been mainly used as electron emission sources 15. A diffuser 30 may be further formed on anode panel 20, and diffuser 30 diffuses visible rays transmitted through upper substrate 21.

In the above described structure, when a predetermined voltage is applied between anode 23 and cathode 13, electrons are emitted from electron emission sources 15, and the emitted electrons are accelerated towards anode 23 so as to collide with phosphor layer 26. Accordingly, phosphor layer 26 is excited so that visible rays are emitted, and the emitted visible rays are transmitted through upper substrate 21 and proceed outside. In the conventional field emission type backlight unit, since visible rays emitted from phosphor layer 26 are radiated in all directions, visible rays need to be guided towards an upper part of upper substrate 21, on which a liquid crystal panel is disposed, in order to improve light efficiency. In order to do this, a reflective layer (now shown) formed of aluminum may be further formed on phosphor layer 26.

Figure 2:
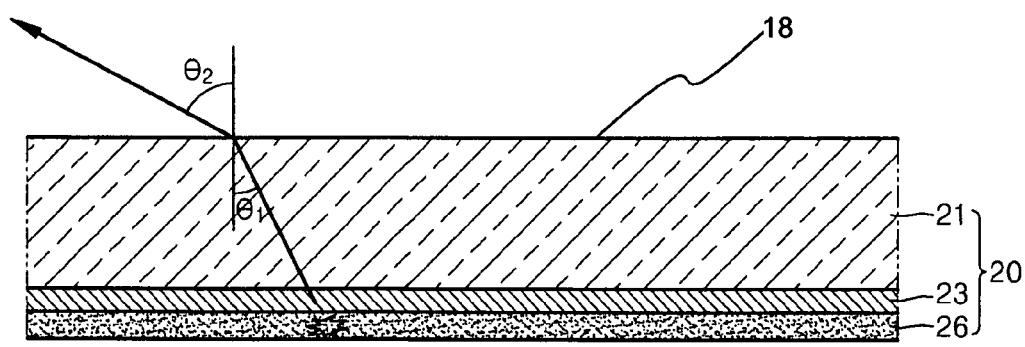
FIG. 2 is a diagram illustrating a path of visible rays generated by a phosphor layer in an anode panel illustrated in FIG. 1.

FIG. 2 is a diagram illustrating a path of visible rays generated by phosphor layer 26 in anode panel 20 illustrated in FIG. 1. Referring to FIG. 2, visible rays generated by phosphor layer 26 proceed from a lower surface of upper substrate 21 formed of a glass to the outside. At this time, a refraction angle $\theta_2$ of the visible rays emitted to the outside is considerably greater than an incidence angle $\theta_1$ because of different refractive indices of the upper substrate and the medium at the outside of unit. Accordingly, part of the visible rays emitted from phosphor layer 26 deviate from the area over upper substrate 21, and thus light efficiency is reduced. In the field emission type backlight, a high voltage should be applied to anode 23 in order to improve luminous efficiency of phosphor layer 26. However, when a high voltage is applied to anode 23, the temperature of the upper substrate 21 on which anode 23 is formed, increases, and accordingly, upper substrate 21 may be damaged due to thermal expansion as a result of the increased temperature.

Figure 3:
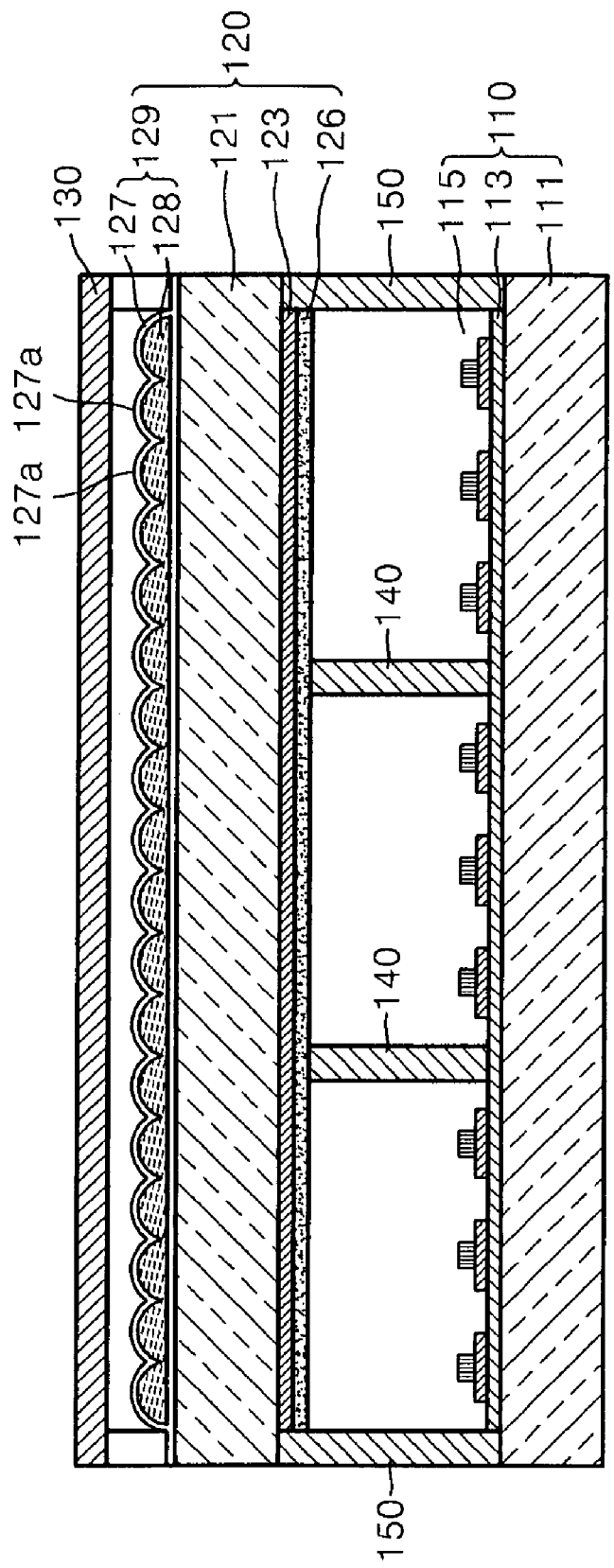
FIG. 3 is a schematic cross-sectional view illustrating a field emission type backlight unit according to an embodiment of the present invention.

FIG. 3 is a schematic cross-sectional view illustrating a field emission type backlight unit according to an embodiment of the present invention.

Referring to FIG. 3, an anode panel 120 and a cathode panel 110 are spaced apart so as to face each other. Anode panel 120 and cathode panel 110 are spaced apart by a predetermined interval by spacers 140 disposed between anode panel 120 and cathode panel 110. Sealing members 150 sealing an inner space between anode panel 120 and cathode panel 110 are formed on edges of the inner space between anode panel 120 and cathode panel 110.

Anode panel 120 includes an upper substrate 121, an anode 123, a phosphor layer 126 and a liquid pack 129. Upper substrate 121 is a transparent substrate and may be formed of a glass, but is not limited thereto. That is, upper substrate 121 may be a plastic substrate or the like.

Anode 123 is formed on a lower surface of upper substrate 121. Anode 123 may be formed by depositing a transparent conductive material such as indium tin oxide (ITO) or the like on an entire lower surface of upper substrate 121. Phosphor layer 126 is formed on a lower surface of anode 123. Phosphor layer 126 is excited by electrons generated by electron emission sources 115, which will be described later, so as to emit visible rays. Phosphor layer 126 is formed on an entire lower surface of anode 123, and is formed of phosphors for red, green and blue. Although not illustrated in the figures, a reflective layer may be further formed on a lower surface of phosphor layer 126. The reflective layer reflects the visible rays generated from phosphor layer 126 towards upper substrate 121, and may be formed of, for example, aluminum.

Liquid pack 129 is formed on an upper surface of upper substrate 121. By refracting visible rays generated by phosphor layer 126, which are to be transmitted through upper substrate 121 to an upper part of upper substrate 121, liquid pack 129 improves light efficiency, and simultaneously prevents a temperature of upper substrate 121, which may be increased due to a voltage applied to anode 123, from increasing. Liquid pack 129 is composed of a transparent cover 127 having lens type curved portions 127a and transparent liquid 128 filling in the curved portions 127a. Transparent cover 127 may be formed of, for example, a transparent synthetic resin. Examples of the synthetic resin may be polystyrene, polyvinyl chloride, polyester, polyethylene, polypropylene, polycarbonate or the like. However, the material of transparent cover 127 is not limited to the above materials. That is, transparent cover 127 may be formed of various materials in addition to the above materials.

Lens type curved portions 127a are formed in transparent cover 127. Curved portions 127a may be formed so as to have a cylindrical lens shape or convex lens shape. Spaces in curved portions 127a are formed so as to be connected to each other. At this time, since transparent liquid 128 filling the space within curved portions 127a is circulated in transparent cover 127, transparent cover 127 can effectively prevent a temperature of upper substrate 121 from increasing. On the other hand, curved portions 127a may be formed so that spaces of curved portions 127a may be respectively separated from each other.

Transparent cover 127 is filled with transparent liquid 128. Since each curved portions 127a of transparent cover 127 has a lens shape, transparent liquid 128 filling curved portions 127a also has a lens shape. Accordingly, due to a focusing effect by curvature on a surface of lens type transparent liquid 128, most of visible rays generated by phosphor layer 126 and transmitted through upper substrate 121 can be refracted to the upper part of upper substrate 121.

Transparent liquid 128 may be, for example, water or transparent oil, but is not limited thereto. That is, various liquids can be used as transparent liquid 128. Transparent liquid 128 may be liquid having a smaller refractive index than that of upper substrate 121. However, transparent liquid 128 may be liquid having a greater refractive index than that of upper substrate 121. In addition, transparent liquid 128 may be a liquid having a relatively great specific heat capacity in order to effectively prevent the temperature of upper substrate 121 from being increased.

Cathode panel 110 includes a lower substrate 111, a cathode 113 and electron emission sources 115. Lower substrate 111 may be a glass substrate, a transparent plastic substrate or the like, similar to upper substrate 121. Cathode 113 is formed on lower substrate 111 so as to have a predetermined shape. For example, cathode 113 may be formed so as to have a stripe shape, or may be formed so as to cover an entire upper surface of lower substrate 111. Cathode 113 may be formed of a metal material or a transparent conductive material such as indium tin oxide (ITO) or the like. The plurality of electron emission sources 115 are formed on an upper surface of cathode 113. Electron emission sources 115 emit electrons by an electric field generated between anode 123 and cathode 113, and may be formed of carbon nanotubes (CNTs) having a good electron emission property, but are not limited thereto. Although not illustrated, a gate electrode for extracting electrons is further formed on cathode panel 110. At this time, a gate insulating layer (not shown) and a gate electrode (not shown) may be sequentially formed on cathode 113, and electron emission sources 115 may be disposed in emitter holes (not shown) formed in the gate insulating layer.

A diffuser 130 can be further formed on the anode panel 120 to uniformly diffuse visible rays transmitted through upper substrate 121 and liquid pack 129.

In the field emission type backlight unit having the above structure, when a predetermined voltage is applied to each of anode 123 and cathode 113, electrons are emitted from electron emission sources 115, and are accelerated towards anode 123. The accelerated electrons collide with phosphor layer 126 formed on anode 123, and thus visible rays are generated from phosphor layer 126. The visible rays are transmitted through upper substrate 121 and liquid pack 129 and proceed to an upper part of anode panel 120.

Figure 4:
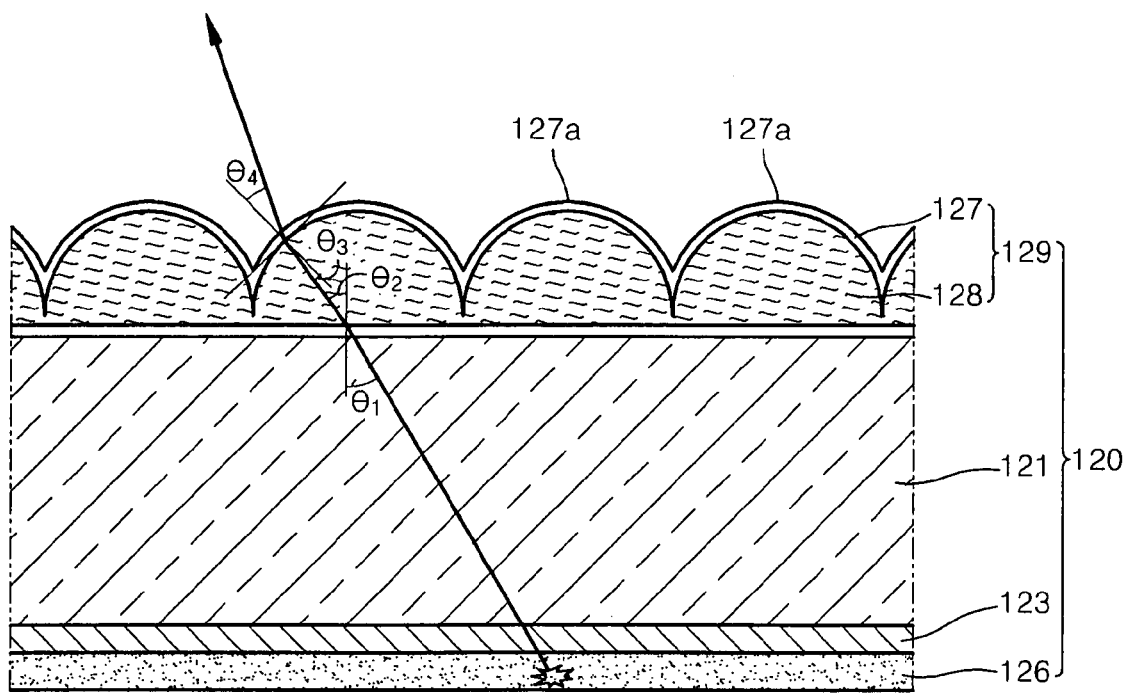
FIG. 4 is a diagram illustrating a path of visible rays generated by a phosphor layer in an anode panel of a field emission type backlight unit according to another embodiment of the present invention.

FIG. 4 is a diagram illustrating a path of visible rays generated by a phosphor layer in anode panel 120 of a field emission type backlight unit according to another embodiment of the present invention. Referring to FIG. 4, the refractive index of transparent liquid 128 is smaller than that of upper substrate 121. For example, upper substrate 121 may be a glass substrate, and transparent liquid 128 may be water. In this particular embodiment, the refractive indices of glass and water are 1.5 and 1.33 respectively, and the refractive index of air is 1.

Visible rays generated by phosphor layer 126 are refracted on an interface between upper substrate 121 and transparent liquid 128 at a refraction angle $\theta_2$ which is a little greater than an incidence angle $\theta_1$, and the refracted visible rays are refracted on an interface between transparent liquid 128 and the external air at a refraction angle $\theta_4$, which is a little greater than an incidence angle $\theta_3$, and thus, proceed to the outside of the unit. Since transparent liquid 128 has a lens shape, due to a focusing effect by curvature on a surface of lens type transparent liquid 128, most of visible rays generated by phosphor layer 126 and transmitted through upper substrate 121 proceed to the upper portion of upper substrate 121. Accordingly, while part of the visible rays generated by a phosphor layer deviate from the area over an upper substrate in a conventional field emission type backlight unit, most of rays are guided to the upper portion of upper substrate 121 to thereby improve light efficiency in the field emission type backlight unit according to the current embodiment. Accordingly, the brightness of the backlight unit can be improved. In a conventional backlight unit, a significant portion of visible rays emitted from phosphor layer 26 are refracted to the outside of the unit through upper substrate 21 because of the large incident angle $\theta_1$, based on Snell's rule, $\theta_1/n1=\theta_2/n2$ (wherein $\theta_1$ is the incident angle of the impingent light against a surface 18, $\theta_2$ is the refraction angle formed by the departing light, n1 is the index of the medium 21 from which light departs and n2 is the index of the medium to which light enters). When a ray has a large enough incident angle $\theta_1$ at the upper surface of upper substrate 21, fraction angle $\theta_2$ of this ray becomes so large that this ray can deviate from the upper portion of upper-substrate 121. The backlight unit, however, employs a liquid pack filling with transparent liquid. Curved portions 127a of liquid pack 129 has a cylindrical rib shape. Therefore, the improved anode panel is able to focus emitted visible rays to the upper portion of upper substrate 121 and reduce the deviating rays.

According to the field emission type backlight unit according to the current embodiment, since liquid pack 129 filled transparent liquid 128 is disposed on upper substrate 121, the temperature of upper substrate 121 due to a high voltage applied to anode 123 can be prevented from increasing. At this time, when spaces in curved portions 127a of transparent cover 127 are formed so as to be connected to each other, since transparent liquid 128 filling curved portions 127a can circulate in transparent cover 127, the temperature of upper substrate 121 can be effectively prevented from increasing.

As described above, according to the present invention, visible rays generated by a phosphor layer are guided to an upper portion of an upper substrate using a liquid pack filled with lens type transparent liquid, and thus light efficiency can be improved compared to that of a conventional backlight unit to thereby increase the brightness of a backlight unit according to the present invention. In addition, a temperature of the upper substrate due to a voltage applied to an anode can be effectively prevented from increasing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An anode panel of a field emission type backlight unit, comprising:
   a transparent substrate;
   an anode formed on a lower surface of the substrate;
   a phosphor layer coated on a lower surface of the anode;
   a liquid pack disposed on an upper surface of the substrate; and
   said liquid pack comprising a transparent cover having cylindrical lens shape curved portions and a transparent liquid filling in the curved portions.

2. The anode panel of claim 1, wherein the substrate is a transparent substrate.

3. The anode panel of claim 1, wherein the anode is formed of a transparent conductive material.

4. The anode panel of claim 3, wherein the anode is formed of indium tin oxide (ITO).

5. The anode panel of claim 1, wherein the curved portions have a cylindrical lens shape or a convex lens shape.

6. The anode panel of claim 1, wherein the transparent cover is formed of a synthetic resin.

7. The anode panel of claim 1, wherein spaces in the curved portions are connected to each other so that the transparent liquid circulates in the transparent cover.

8. The anode panel of claim 1, wherein the transparent liquid is water or transparent oil.

9. The anode panel of claim 1, wherein a reflective layer is further formed on a lower surface of the phosphor layer.

10. The anode panel of claim 9, wherein the reflective layer is formed of aluminum.

11. A field emission type backlight unit, comprising:
    a cathode panel;
    an anode panel spaced apart from said anode panel and facing to said anode panel; and
    said anode panel comprising an transparent upper substrate, an anode formed on a lower surface of the upper substrate, a phosphor layer coated on a lower surface of the anode, and a liquid pack disposed on an upper surface of the substrate, said liquid pack comprising a transparent cover having cylindrical lens shape curved portions and a transparent liquid filling the curved portions.

12. The backlight unit of claim 11, wherein the upper substrate is a transparent substrate.

13. The backlight unit of claim 11, wherein the anode is formed of a transparent conductive material.

14. The backlight unit of claim 11, wherein the curved portions have a cylindrical lens shape or a convex lens shape.

15. The backlight unit of claim 11, wherein the transparent cover is formed of a synthetic resin.

16. The backlight unit of claim 11, wherein spaces in the curved portions are connected to each other so that the transparent liquid circulates in the transparent cover.

17. The backlight unit of claim 11, wherein the transparent liquid is water or transparent oil.

18. The backlight unit of claim 11, wherein a reflective layer is further formed on a lower surface of the phosphor layer.

19. The backlight unit of claim 11, wherein the cathode panel comprises:
    a lower substrate spaced so as to face to the upper substrate;
    a cathode formed on a upper surface of the lower substrate; and
    an electron emission source formed on an upper surface of the cathode.

20. The backlight unit of claim 19, wherein the electron emission source is formed of carbon nanotubes (CNTs).

21. The backlight unit of claim 11, further comprising:
    a spacer disposed between the anode panel and the cathode panel and maintaining a predetermined interval between the anode panel and the cathode panel.

22. The backlight unit of claim 11, further comprising:
    a diffuser disposed on an upper portion of the anode panel.

* * * * *